Nov. 19, 1957 R. J. HOPPER 2,813,719
AIRCRAFT TOW TARGET INSTALLATION
Filed July 11, 1955 5 Sheets-Sheet 1

ROBERT J. HOPPER,
INVENTOR.

BY
ATTORNEY.

Nov. 19, 1957 R. J. HOPPER 2,813,719
AIRCRAFT TOW TARGET INSTALLATION
Filed July 11, 1955 5 Sheets-Sheet 2

ROBERT J. HOPPER,
INVENTOR.

BY *George J. Smyth*

ATTORNEY.

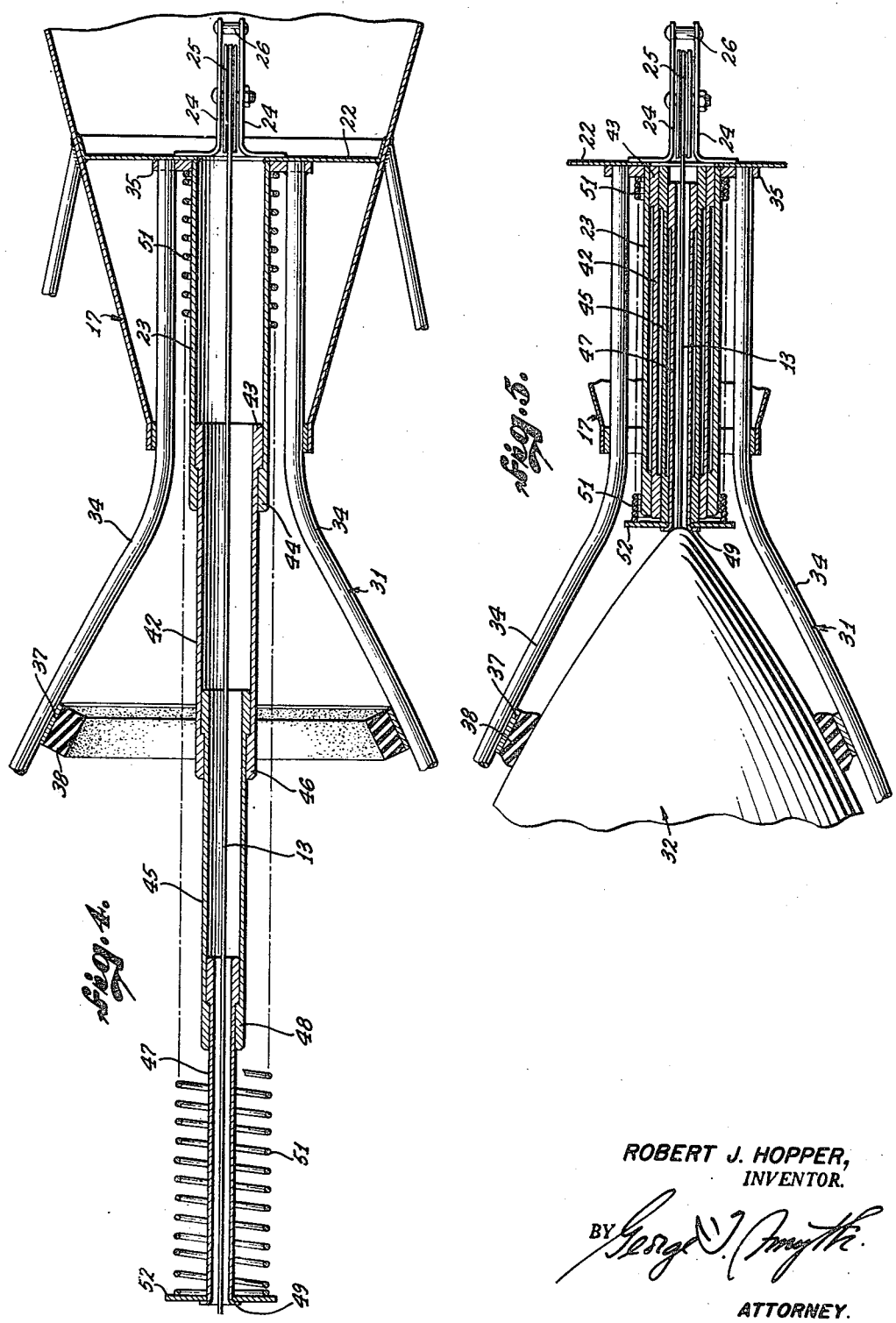

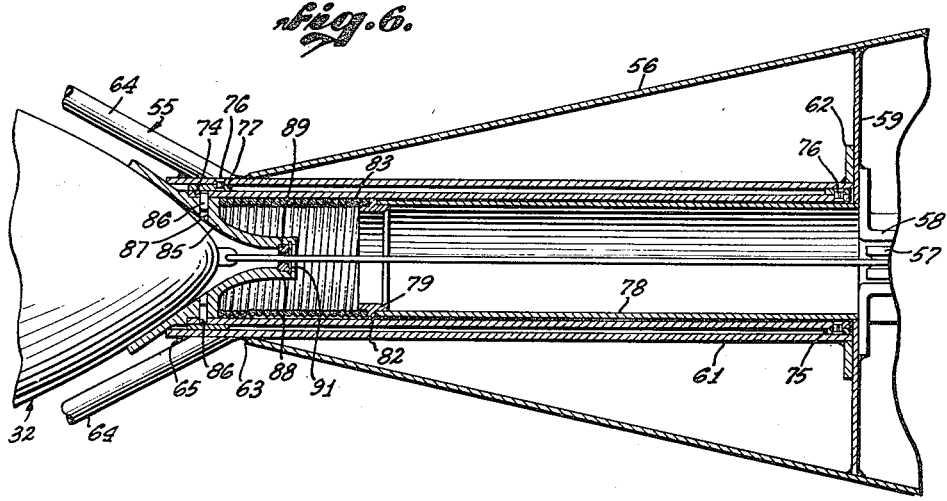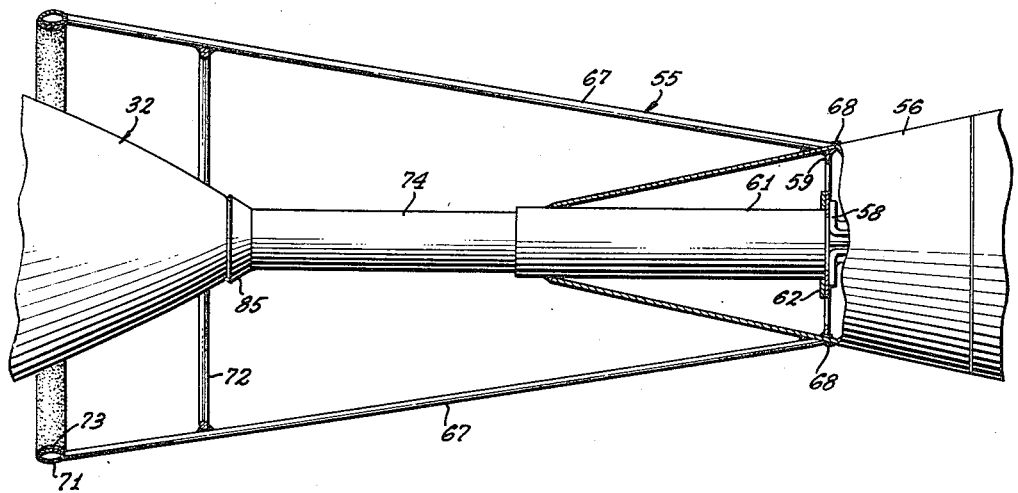

Nov. 19, 1957 R. J. HOPPER 2,813,719
AIRCRAFT TOW TARGET INSTALLATION
Filed July 11, 1955 5 Sheets-Sheet 5
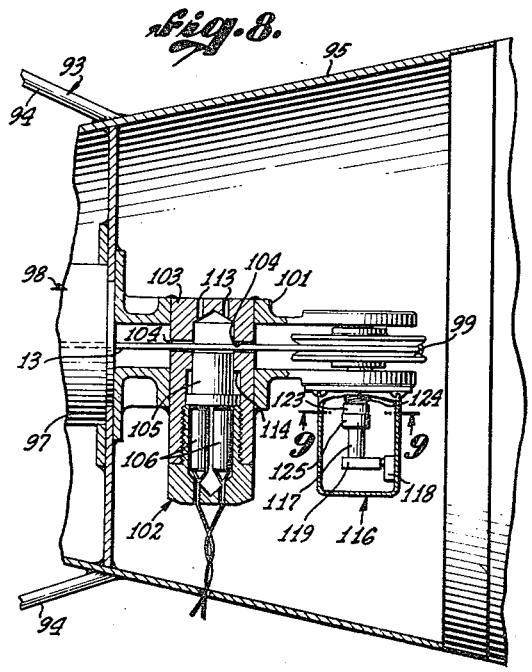
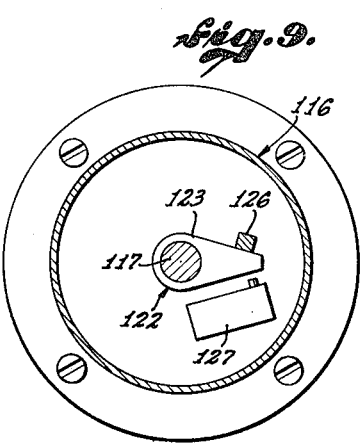
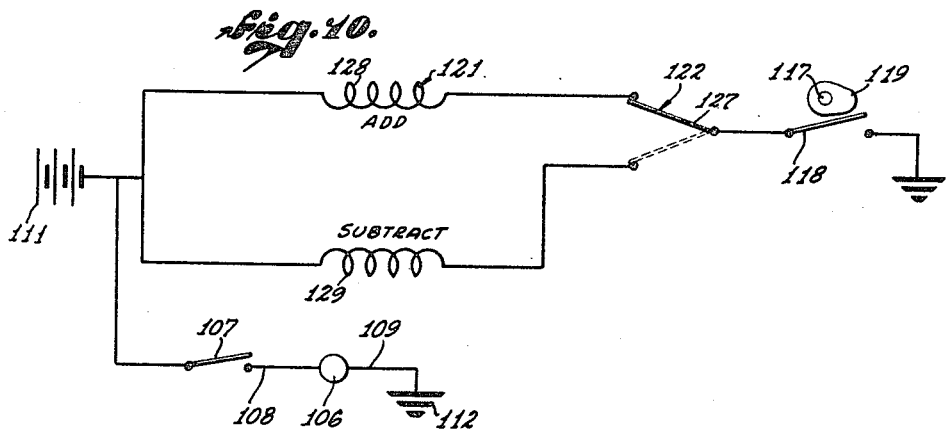
ROBERT J. HOPPER,
INVENTOR.
BY
ATTORNEY.

2,813,719

AIRCRAFT TOW TARGET INSTALLATION

Robert J. Hopper, Pacific Palisades, Calif., assignor to Del Mar Engineering Laboratories, Inc., Los Angeles, Calif., a corporation Application July 11, 1955, Serial No. 521,058

15 Claims. (Cl. 273—105.3)

This invention relates to tow target installations for aircraft and more particularly to such an installation which includes a device for releasably mounting an aerial tow target to an aircraft.

The installation of the present invention is particularly adapted for use with an aerial target of the type disclosed and claimed in my copending application, Ser. No. 471,234. Targets of the type therein shown are used in various types of aerial gunnery practice and are preferably formed of low density, low strength material. Such targets are, therefore, frangible and care must be exercised in launching and retrieving the target. It is to be understood, however, that targets of various types may be used with installations of the present invention.

The installation of the present invention includes in all embodiments illustrated, a launching device to be mounted to the towing aircraft and serves to nest or cradle the target until the same is released for tow by a cable fixed to the aircraft. The tow cable is preferably carried by and under the control of a reel apparatus also mounted to the towing aircraft. As the reel apparatus is operative to unwind the cable therefrom and to retrieve the played-out cable, the target may thus be released and then at the conclusion of the gunnery practice drawn into and again nested within the device.

The launching device of the present invention in the broadest aspects thereof, comprises a basket-like body or cradle member defining a chamber having a contour substantially like the forward or nose portion of the target used therewith. The tow cable attached to the target runs or passes through guide means carried by the body or cradle member and movable in a path substantially coincident with the longitudinal axis of the same. As the body member is to be so mounted to the towing aircraft that the longitudinal axis of the body member extends substantially parallel to the fore-and-aft axis of the aircraft, the target is launched and retrieved in a course substantially the same as the flight path of the towing aircraft. This arrangement insures that the target path, both in the launching and retrieving operations, will coincide with the longitudinal axis of the body member and thus obviates damage to the target as it leaves the device or is drawn back into the same.

The target is normally held or cradled within the launching device by the tension induced in the cable by the reel apparatus. To insure that the target is launched from the device as the cable is released or played out from the reel, ejector means are employed which resiliently thrust the target from its storage position. The ejector means is carried by or forms a part of the guide means for the tow cable and movable, as above explained, in a path substantially coincident with the longitudinal axis of the body member. Once the cable is released or unwound from the reel, the ejector mechanism resiliently thrusts the target out of the body member whereupon the air loads on the target carry it rearwardly of the aircraft under the control of the tow cable as it is unwound from the reel.

The ejector mechanism also serves as a shock absorbing means as the target is retrieved and drawn into the basket-like body member by the cable as the latter is wound upon the reel. As the target is initially drawn into the body member, the resilient means of the ejector mechanism absorbs the energy of the moving target and thus reduces the likelihood of damage to the target as it moves into its final storage position within the body member, as well as damage to the cable and reel apparatus.

As the guide means for the tow cable is carried by and forms a part of the ejector mechanism, this guide means moves outwardly and remains extended from the inner end of the body member so long as the target is free of the body member. Thus the guide means, in its extended position, serves to center the course of the tow cable as the target is retrieved and acts to hold the tow cable and consequently the target itself out of engagement with the body member until the target is properly aligned with the body member for final movement into the storage or nested position therein.

The combined ejector and cable guide means also acts to maintain the cable taut whenever the target is carried within the launching device. This is an important feature in those installations particularly where the reel apparatus is carried by the aircraft at a station thereon spaced from the launching device.

In one embodiment of the installation herein disclosed, remote control means are provided for severing the cable to permit the target to be released from the towing aircraft. The cable severing device is carried by the launching device and is made operative through an electric circuit under the manual control of the pilot.

A further feature of the present invention is the provision of means for indicating to the pilot of the towing aircraft the extent of the cable played out from the reel. Furthermore, this indicating means is so constituted as to indicate at all times whether the cable is being played out from the reel or is being wound upon the reel.

Other features and advantages of the present invention will be hereinafter apparent from the following description, particularly when taken in connection with the accompanying drawing, in which—

Figure 4 is a fragmentary view in section showing the combined target ejector and cable guide means in its extended position;

Figure 5 is a fragmentary view in section showing the combined ejector and cable guide means in the storage position;

Figure 6 is a view in section of a modified form of the launching device showing the target in its nested position;

Figure 7 is a view partly in section and partly in elevation showing the combined ejector and cable guide means in the fully extended position;

Figure 8 is a view, partly in section and partly in elevation, showing a further modified form of the launching device;

Figure 9 is a section taken along line 9—9 of Figure 8; and

Figure 10 is a showing of the wiring diagram of the embodiment shown in Figure 8.

Figure 1:
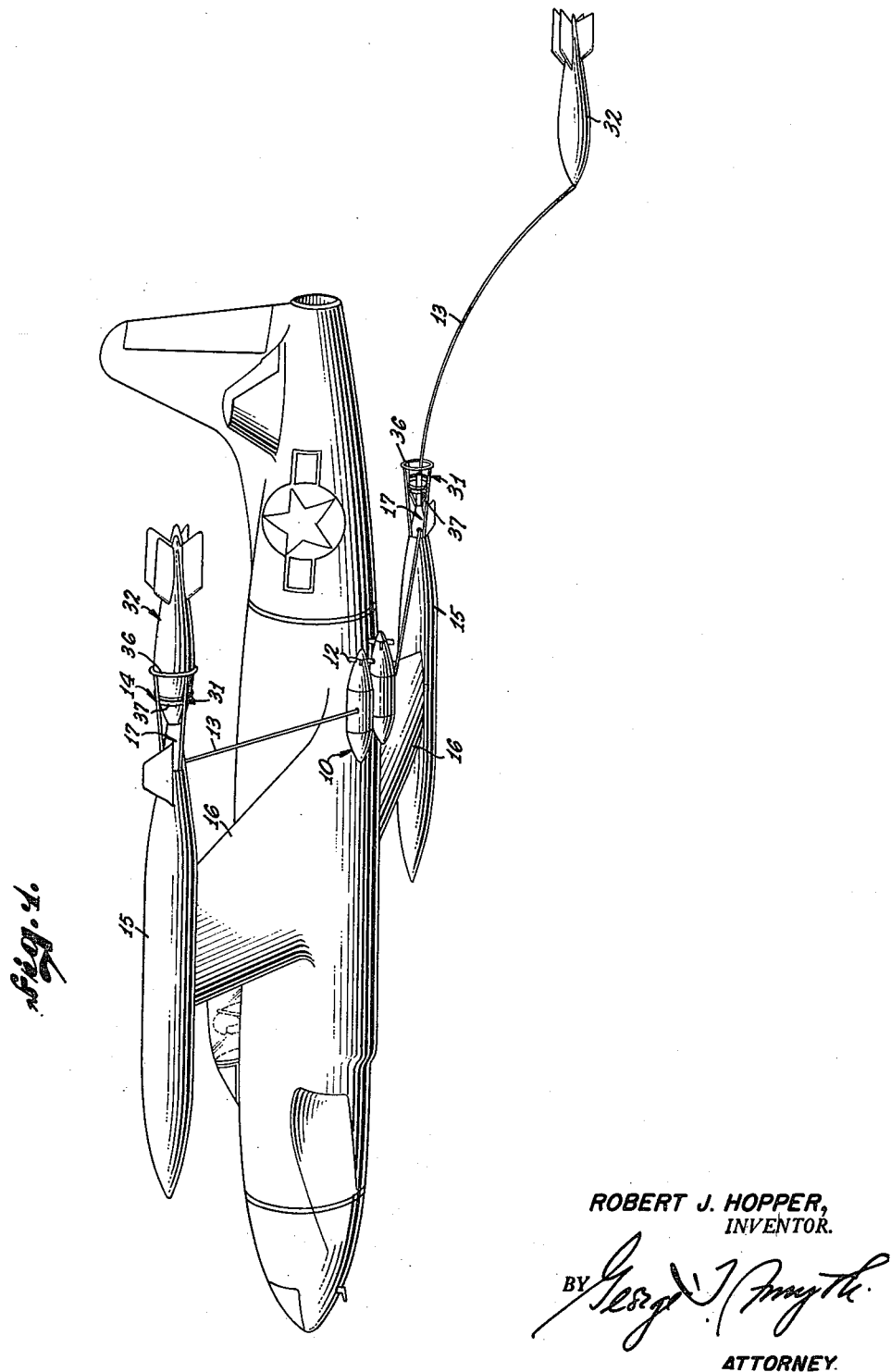
Figure 1 is a perspective view of an aircraft fitted with the tow target installation of the present invention.

The tow target installation of the present invention, referring now to the drawing and more particularly to Figure 1 thereof, comprises a reel apparatus 10 preferably mounted to the under surface of the fuselage of an aircraft 11. The reel apparatus 10 is preferably one which is aerodynamically driven through a propeller or vaned means 12 carried by the shaft to which the reel body per se is mounted. If desired this reel apparatus may embody inventions disclosed and claimed in my copending application, Ser. No. 453,834, now United States Letters Patent No. 2,751,267.

The reel apparatus may be mounted to the under surface of the fuselage by suspension from jato or bomb racks if the aircraft is fitted with such accessories. If such accessories are not present on the towing aircraft, the reel can be supported through suspension means particularly provided for mounting the reel to the fuselage. Also it is to be noted that two installations can be installed on one aircraft in which case two reels would be used. As the installations would be identical only one installation will be hereinafter described.

The reel apparatus 10 mounts a tow cable 13 which is passed from the reel housing to a launching device 14 here shown as mounted to the trailing portion of a wing tank 15 carried by the outboard section of the wing 16 of the aircraft. In the embodiment of the present invention illustrated in Figure 1, the tail cone of the wing tank has been removed and in its place a frusto-conical mounting section 17 is used. The mounting section is secured to the trailing portion of the wing tank by fastener elements, not shown, but similar to the fasteners used to originally mount the tail cone to the wing tank.

The mounting section 17, referring now to Figure 4 of the drawing, includes a bulkhead 22 for internally reinforcing the section and provided with a central opening in which is mounted, by a welding operation, the one end of a rearwardly projecting tubular element 23. The opposite face of the bulkhead mounts a bracket member 24 rotatably supporting a pulley 25 over which the cable 13 runs. The bracket so mounts the pulley as to direct the cable rearwardly and coaxially into the tubular element 23. The bracket 24 further mounts a cable guide 26 rotatably carried between the arms of the bracket and operative to hold the cable against accidental separation from the pulley 25.

Figure 2:
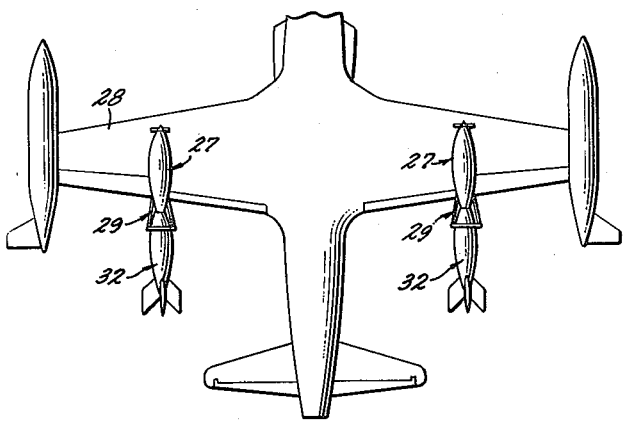
Figure 2 is a bottom plan view of an aircraft showing a modified form of the installation.

Although the mounting section in the embodiment of the invention shown in Figure 1 forms a means for supporting the launching device 14 to the wing tip tank, it is to be understood that the launching device need not be mounted to such a tank. For example, there is shown in Figure 2 of the drawing an installation in which the reel apparatus 27 is mounted to the under-surface of the wing 28 of the aircraft through a rocket launcher or similar accessory and the launching device is fixed to the aft portion of the reel apparatus 27 to project longitudinally therefrom through a mounting section 29 substantially identical to the mounting section 17.

Figure 3:
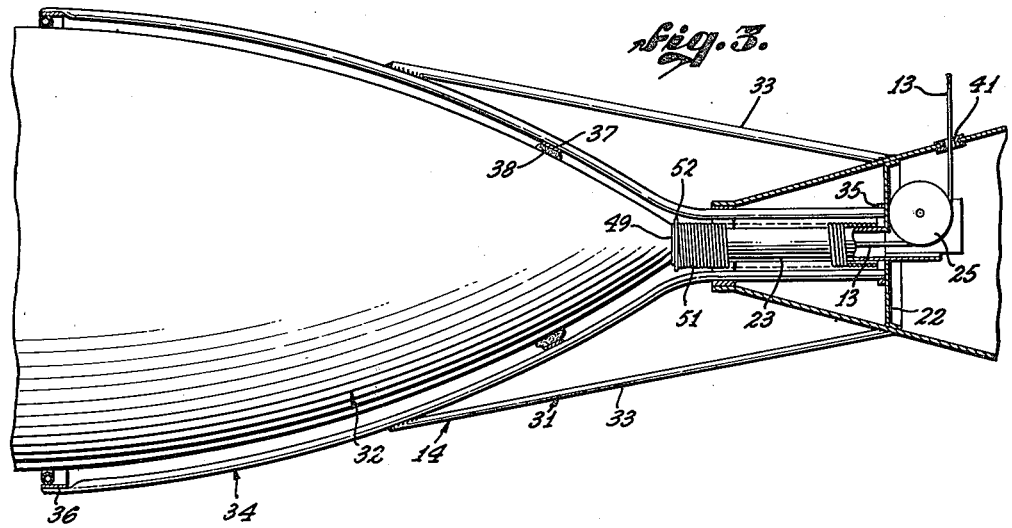
Figure 3 is a view partly in section and partly in elevation of one form of the launching device showing the target in the fully nested position therein.

The body member of the launching device 14, referring now to Figure 3, comprises a framework 31 of interconnected frame elements defining a basket-like receptor element open at one end and defining a chamber of substantially the same size and configuration as the forward section of the tow target 32 used in the installation of the present invention. The framework 31 comprises a plurality of longitudinally extending outer elements 33, the inner ends of which are welded or otherwise anchored to the exterior surface of the mounting section 17 contiguous to the bulkhead 22. The elements 33 may be formed of rods of suitable metal and extend rearwardly in a divergent relationship, the outer end of each being secured again as by welding to an inner frame element 34 also carried by the mounting section 17.

The inner ends of the frame elements 34 extend inwardly of the open end of the mounting section 17 for anchorage by welding within openings or sockets formed in a plate 35 fixed to the trailing face of the bulkhead 22. The inner longitudinal members 34, here shown as four in number, are connected at their outer ends to a ring member 36 defining the open end of the basket-like body member of the launching device. A second ring member 37 circumscribes the inner end portion of the body member and serves to reinforce the framework 31. The ring member 37 may take the form of a circularly-formed strap or band, to the inner face of which is bonded, or otherwise secured, a cushioning strip 38 formed of rubber or some resilient material. A similar cushioning strip is also carried by the inner surface of the ring member 36.

The target 32 may be of the general type shown in my copending application, Ser. No. 471,234, and it will be seen now that the framework 31 does define a basket-like element open at the normally rear end for receiving or nesting the forward portion of the target body 32. The target body 32 is carried at the free end of the cable 13 and this cable is led from the reel apparatus 10 through a guide 41 mounted in an opening formed, as best seen in Figure 3 of the drawing, in the wall of the mounting section 17. The cable 13 is then passed about the pulley 25 and led rearwardly through the tubular element 23 fixed in the central opening of the bulkhead 22. The tubular element 23 telescopically mounts a second tubular element 42 which is formed with an enlarged bearing portion 43 having an outer diameter substantially equal to the inner diameter of the tubular member 23. The tubular member 23 is formed at the outer end thereof with a stop shoulder 44 which limits coaxial outward or rearward movement of the tubular element 42.

The tubular element 42 in turn mounts a third element 45 which is formed with a bearing portion similar to the portion 43 and here again the element 42 carries a stop shoulder 46 for limiting outward movement of the element 45. The element 45 mounts a fourth tubular element 47 which is also limited in its outward movement by a stop shoulder 48 carried at the end of the element 45.

The cable 13 is passed longitudinally through the telescopically mounted elements and the tubular element 47 is formed at its outer end with a thrust pad 49 which is adapted to engage against the nose section of the target 32 when the latter is in its nested or storage position. A coil spring 51, seated at the one end of the plate 35 and engaged at its opposite end against a plate 52 mounted to the tubular element 47 and held against separation therefrom by the thrust pad 49, normally acts to urge the telescopically mounted elements to their fully extended position shown in Figure 4 of the drawing. The thrust pad is herein shown as an outwardly flared terminal section of the element 47 although this pad may be separately formed and fixed to the outer end of the element 47 by conventional means.

In the use of the target installation just described, the reel apparatus 10 controls the cable 13 and with the cable wound upon the reel body the target 32 is held in the fully nested position shown in Figure 3 of the drawing by the tension in the cable.

At the time the target is to be launched or ejected from the launching device 14, the cable is played out or unwound from the reel and the release of the tension in the cable permits, as should now be understood, the spring 61 to quickly thrust or eject the target from its fully nested or storage position of Figure 3. Once the target is ejected by the thrust applied thereto by the pad 49 under the urging of the spring 51, the drag of the target is sufficient to unwind the cable 13 from the reel apparatus 10, and the reel apparatus can be so operated aerodynamically through the propeller or vaned means 12 to reduce to a minimum the amount of drag required to unwind the cable from the reel body.

The ejector mechanism not only acts to quickly thrust the target from the launching device once the cable is released from the reel apparatus, but also maintains the cable taut during this phase of the launching operation. This is particularly important where an installation such as shown in Figure 1 is employed. This is so for there are considerable air loads imposed on the course of the cable intermediate the reel apparatus and the launching device and mere unwinding of the cable would not insure proper functioning of the cable until the target was free of the launching device and the resulting drag great enough to maintain the cable taut.

With the target body released from the launching device 14 the several telescopically mounted tubular elements will be held in their fully extended position by the spring 51 and the thrust pad 49 disposed centrally of the ring 36 but slightly inboard therefrom. It will thus be seen that the several telescopically mounted tubular elements acts as a cable guide means to center the course of the cable relative to the open end of the launching device. This disposition of the guide means acts to hold the cable and consequently the target body 32 out of engagement with the ring member 36 as the target is retrieved or drawn back into the launching device.

To retrieve the target after a gunnery practice, the reel apparatus 10, through the propeller or vane means 12, is operated to wind the cable 13 upon the reel body. As the cable 13 is wound upon the reel body, the cable draws the target 32 into the launching device and once the nose section of the target body engages with the thrust pad 49, the shortening cable 13 draws the target into the launcher, the several tubular elements collapsing to the fully collapsed position shown in Figure 5 to allow the target to move into the fully nested or storage position of Figure 3. The target is thereafter held in this fully nested or storage position by the tension of the cable 13 under the control of the reel apparatus 10. The cable holds the target snugly against the cushioning elements 38 and this snug engagement maintains the target 32 immobile even were the target body is fitted with fins designed to produce rotation of the target in towed flight.

As the aerodynamically operated reel apparatus will positively retrieve the cable, the target, unless care is taken, may move the launching device with considerable velocity. The ejector mechanism acts in this instance as a shock absorbing means for the target, as the compressing spring in absorbing energy from the moving target lessens shock to the latter as it engages with the thrust pad. Furthermore, damage to the reel apparatus is lessened for the collapsing spring progressively induces loads into the reel apparatus as the target moves into its fully nested position.

In the form of the launching device shown in Figures 6 and 7 of the drawing, the framework 55, defining the basket-like receptor element for the target, is also supported by a mounting section which replaces the usual tail cone of the swing tip tank of the aircraft. The mounting section 56 includes a pulley 57 mounted within the section 56 by a suitable bracket 58 carried by a bulkhead 59 spanning the mounting section intermediate the ends thereof. As in the earlier described form of the launching device, the cable is passed into the mounting section from the reel apparatus and is carried about the pulley 57 and into a tubular element 61, the one end of which is secured as by welding within a centrally located opening of a plate 62 which in turn is welded or otherwise secured to the rear face of the bulkhead 59.

The tubular element 61 is carried coaxially of the mounting section and the outer terminal portion of the element projects through the open end of the mounting section, the terminal portion being secured in position within the open end of the section by welds, indicated at 63.

Rod-like elements 64 forming a part of the framework 55 are secured to the terminal portion of the tubular element by welds 65 and these elements divergently project outwardly and rearwardly of the mounting section, the outer ends of the frame elements 64 being secured by welds 66 to outer frame elements 67 intermediate the ends thereof.

The frame elements 67 are connected at their inner ends to the mounting section 56 by welds 68, the outer ends of these elements being secured by welds 69 to a ring member 71 which defines the open end of the basket-like receptor element of the launching device. A second ring member 72 is secured to the inner faces of the frame elements 67 at a position inboard of the ring member 71 and contiguous to the connection between the frame elements 64 and 67. The ring member 71 preferably carries a cushioning element or liner 73 of some suitable resilient material which serves the same function as the cushioning liner 38 previously described.

The tubular element 61 forms a part of a combined cable guide and ejector mechanism similar in form and function to the telescopically mounted tubular elements of the earlier described form of the invention. In the form now being described, the tubular element 61 telescopically mounts an inner tubular element 74 which carries at its inner end a stop element 75 formed by a collar-like member circumscribing the inner end of the tubular element 74. The collar 75 is fixed to the tubular element 74 preferably by rivets 76 as best shown in Figure 6 of the drawing. The stop 75 limits outward movement of the tubular element 61 as a cooperating limiting stop element is carried internally of the tubular element 61 adjacent the outer end thereof. Here again the stop element is formed by a collar 77 telescopically fitted within the open end of the element 61 and mounted by means of the rivets 76 shown. It should now be seen that the inner element 74 is movable longitudinally of the fixed element 61 from the fully collapsed position of Figure 6 to the extended position shown in Figure 7.

As in the earlier described form of the invention the combined cable guide element and ejector means for the target is spring urged to the extended position, and to this end a tubular member 78 has one end fixed within an opening in the bulkhead 59 to extend coaxially of the assembly 57—74. The outer end of the tubular member 76 mounts a seat element 79 in the form of a collar having a circumferentially extending flange 82 engaged against the end wall of the tubular element 78. The flange 82 serves as a seat member for a coiled spring 83 which is telescopically fitted within the tubular element 78 to engage against a thrust pad 85 fixed to the outer end of the element 78.

The thrust pad 85 comprises a frusto-conical portion engageable with the nose section of the target 32 as best seen in Figure 6, and is fixed to the tubular section 74 through shear-resisting pins 86 passed through bores 87 formed in the thrust pad 85 and engaged in registering openings formed about the wall of the element 74. The thrust pad 85 terminates at its inner end in a cable guide member 88 which includes an annular ring member 89 held against a seat by a split retaining ring 91.

It will now be seen that here again so long as the cable is maintained wound on the reel apparatus, the tension in the cable 13 holds the target 32 engaged with the thrust pad 85 with the tubular element 74 collapsed against the action of the spring 83. In this relative position, the element 74 occupies the position shown in Figure 6 and the spring 79 is fully collapsed to store energy therein for the ejection of the target 32 once the cable 13 is unwound or released for the reel apparatus.

Once the tension in the cable 13 is released, the thrust pad 85 under the urging of the spring 83 very quickly ejects the target from the receptor element formed by the framework 55 and the inner tubular element 74 moves to the extended position shown in Figure 7. Here again it will be seen that the ejector mechanism also serves as a cable guide element which acts to center that course of the cable runningly engaged with the cable guide element 88 relative to the open end of the launching device. Thus, as the cable is retrieved through selective operation of the reel apparatus, the shortened cable draws the target 32 into the receptor means and the extended tubular element 71 acts to center the course of the retrieving cable to hold the cable and consequently the target 32 centered relative to the axis of the framework 55.

As the target is drawn into the framework and the nose section thereof engages the thrust pad 85, the tubular element 74 moves to the right, as viewed in Figure 7, to its collapsed position shown in Figure 6 to snugly nest the target body within the receptor element formed by the framework 55. As in the earlier described embodiment of the invention, the snug engagement of the target with the cushioning material 73 holds the target against rotational movement even though the latter is fitted with fin elements which aerodynamically rotate the target in towed flight.

The form of the launching device shown in Figure 8 of the drawing is similar to the form of Figure 6 and includes a basket-like receptor member 93 of the same construction as the receptor member 55 and comprising frame elements 94 identical to the frame elements 67. Here again the receptor member is to be fixed to the towing aircraft through a mounting section 95 and adapted to be fitted to the wing tip tank as described in connection with the mounting sections 29 and 56.

A bulkhead, spanning the section 95, mounts a tubular element 97 identical to the element 61 of the form of the device shown in Figure 6 and forming a part of a combined ejector and cable guide means 98. A pulley 99 is rotatably mounted within the section 95 by a bracket member 101 riveted or otherwise secured to the bulkhead 96. The pulley directs the cable 13 coaxially rearwardly through the guide 98 as in the earlier described embodiment shown in Figure 6. The bracket member 101 mounts a cable severing or cutting device 102 which is adapted when actuated to sever the cable for release of a portion of the cable and the target from the towing aircraft. The cutting device, in the now preferred form of the invention, comprises a cylinder 103 having openings 104 formed at diametrically spaced sections of the wall thereof for passing the cable 13. A piston 105 is mounted within the cylinder 103 and is normally held intermediate the opposite ends of the cylinder by the passage of the cable diametrically therethrough as above explained.

Mounted between the one end of the piston 105 and the adjacent end wall of the cylinder 103 is a pair of small explosive cartridges 106 which are electrically detonated by the completion of a control circuit including a switch 107, referring now to Figure 10, carried within the aircraft for manual control by the pilot. The control circuit includes leads 108 and 109 leading respectively to a power source 111 and a ground connection 112. The closing of the switch 107 detonates the cartridges 106 and the expanding gases drive the piston 105 upwardly, as viewed in Figure 8, against the cable 13 to shear the cable at the openings 104. The end wall of the cylinder 103 is formed with a series of exhaust ports 113 to permit escape of the air within the cylinder 103 as the piston moves under the explosive force of the detonated cartridges 106. In the preferred form of the cylinder 103, the latter is formed with an annular internal stop shoulder 114 which prevents movement of the piston into engagement with the contiguous end wall of the cylinder.

The pulley bracket 101 also mounts an impulse generator 116 actuated through rotation of the pulley shaft 117. This impulse generator comprises a switch element 118 normally held in an open circuit position by some suitable spring element, the switch being intermittently moved to closed circuit position by a cam 119 fixed to the shaft 117 and driven therewith. It will thus be seen that as the cable runs over the pulley 99 the shaft 117 will be rotatably driven in one direction or another depending on whether the cable is being played out from the reel or being wound thereon. The rotation of the shaft 117 will, therefore, cause the cam 119 to close the switch 118 once during each complete revolution of the shaft 117. The switch 118 forms a part of the circuitry shown in Figure 10 of the drawing and the circuitry further includes a counter mechanism 121 to be mounted within the cockpit of the towing aircraft and adapted to indicate to the pilot the amount of cable played out from the reel.

The impulse generator 116 also includes a drag switch 122 comprising a switch arm 123 that is rotatably mounted on the shaft 117 but in such frictional engagement with this shaft as to tend to rotate therewith. The frictional engagement is provided by a coiled spring 124 that continually urges the switch arm 123 against a collar 125 that is fixedly mounted to the pulley shaft 117. When the shaft rotates counter-clockwise, as viewed in Figure 9, for winding the tow cable 13 onto the reel apparatus 10, the switch arm 123 by tending to follow the rotation of the pulley shaft comes to rest against a stop 126. On the other hand, the tendency of the switch arm 123 to follow the rotation of the pulley shaft 117 when this shaft rotates clockwise as viewed in Figure 9 as the cable is unwound from the reel, causes the switch arm 123 to move into engagement with and actuate a micro-switch 127.

The micro-switch 127, referring now to the wiring diagram of Figure 10, is series connected with the switch 118 and selectively controls the energization of coils 128 and 129 of the counter mechanism 121, these coils being electrically connected to the power source 111. When the micro-switch 127 is in the one position of its operation, the coil 128 is intermittently energized by the closing of the switch 118 and the counter is then actuated to indicate the number of feet of the cable played out from the wheel as the cable is unwinding from the reel. On the other hand when the micro-switch is moved to its other position the coil 129 is intermittently energized and the counter mechanism is so actuated to indicate the amount of cable played out from the reel during the winding in or retrieving operation of the reel. In other words, energization of the coil 128 additively operates the counter mechanism, while energization of the coil 129, in effect, subtracts to indicate the lessening number of feet of the cable played out from the reel apparatus as the cable is wound upon the reel. It will now be seen that the drag switch 122, in cooperation with the micro-switch 127, controls the energization of either the additional coil 128 or the subtraction coil 129 of the counter mechanism 121, the coils being energized selectively in accordance with the direction of rotation of the pulley shaft 117.

The counter mechanism 121 thus clearly indicates to the pilot of the towing aircraft the amount of the cable played out from the reel at all times. Further, the rate at which the counter mechanism is actuated will indicate to the pilot the rate at which the cable and consequently the target is being retrieved or launched from the aircraft. The pilot is particularly concerned with the speed of the target during the retrieving operation, for the target may damage the launching device and consequently the aircraft itself if it moves into its storage or nested position within the launching device at a relatively high speed. As the speed of rotation of the reel apparatus can be controlled through the propeller or vaned means 12, the pilot can, if necessary, decrease the rate at which the cable is being wound upon the reel through adjustment of the propeller or vaned means 12 and consequently reduce the velocity of the target as it approaches the launching device during the retrieving operation.

It should now be seen that in all forms of the invention illustrated the launching device comprises a framework defining a basket-like body member which is to be mounted to the aircraft with the open end of the body member facing rearwardly to permit a target to be carried therein for forcibly launching the same by means passing the tow cable along an axis substantially coincident with the longitudinal axis of the basket-like body member. As the ejecting means also forms a cable guide means, the tow target is automatically centered relative to the basket-like receptor as the cable is wound upon the reel and the target is drawn into the receptor or launching device.

Once the target is drawn into the cradle or receptor element, the spring of the combined ejector and cable guide means acts, in all embodiments illustrated, as a shock absorbing element to obviate damage not only to the target itself, but to the reel apparatus as well. Furthermore, as the combined ejector and guide means normally acts to urge the target outwardly of the receptor element, the cable is maintained taut even though the cable is free to unwind from the reel as during the initial stage of the launching operation. Thus, there is no danger of the cable snarling as the latter is released from the reel and before the drag of the target is sufficient to hold the cable in its proper course as the same is unwound from the reel.

Although the now preferred embodiments of the present invention have been shown and described herein, it is to be understood that the invention is not to be limited thereto, for it is susceptible to changes in form and detail within the scope of the appended claims.

I claim:

1. In an aircraft tow target installation for use with an elongate rigid tow target of a forwardly tapered streamlined configuration, including a reel apparatus for controlling a cable secured to the nose of said target, the combination of: a support member to be secured to the aircraft; a rearwardly facing cradle fixed to said support member and adapted to supportingly nest at least the forward portion of the target; cable guide means mounted for movement relative to said cradle coaxially thereof and passing said cable longitudinally of said cradle; and resilient means normally urging said cable guide means to a position adjacent the outer end of said cradle whereby said guide means is adapted to engage with the nose of said target and to move coaxially of said cradle to center and to absorb the impact of said tow target relative to said cradle as the target is drawn into said cradle as the cable is wound on said reel apparatus.

2. In a combination as set forth in claim 1 in which said cable guide means includes a plurality of telescopically mounted tubular elements, and said resilient means comprises a coiled spring normally urging said elements to an extended position.

3. In an aircraft tow target installation, the combination of: a reel to be mounted to the aircraft; a length of cable to be wound upon and unwound from said reel; a framework defining an open-ended basket-like body member; means for mounting said body member to said aircraft with the open end of said member facing rearwardly of said aircraft; means carried by said body member for passing said cable along an axis substantially coincident with the longitudinal axis of the body member; a rigid tow target of a forwardly tapered streamlined configuration secured to the free end of said cable and adapted to be drawn into said body member for support thereby as the cable is wound upon said reel and released therefrom as said cable is unwound from said reel; and means, including means engaged by the nose of said target as it is drawn into said body member, for ejecting said target from said body member as said cable is unwound from said reel.

4. A combination as set forth in claim 3 which includes means carried by said mounting means, under the control of the pilot of the aircraft, for severing said cable.

5. A combination as set forth in claim 3 which includes means carried by said mounting means for sensing the number of feet of cable unwound from said reel and further includes means for indicating to the pilot of the towing aircraft the number of feet of cable unwound from the reel.

6. In an aircraft tow target installation for use with a tow target of a forwardly tapered streamlined configuration, including a reel apparatus for controlling a cable to which the target is secured, the combination of: a support member to be secured to the aircraft; a rearwardly facing cradle fixed to said support member and adapted to supportingly nest at least the forward portion of a rigid target member; cable guide means mounted for movement relative to said cradle coaxially thereof; and resilient means normally urging said cable guide means to a position adjacent the outer end of said cradle whereby said guide means is adapted to center said tow target relative to said cradle as the target is drawn into said cradle, said resilient means yieldably retracting as the forward portion of said target moves into and nests within said cradle thereby absorbing the shock of impact of said target as it is drawn into said cradle.

7. In an aircraft tow target installation for use with a tow target of a forwardly tapered streamlined configuration, the combination of: a reel to be mounted to said aircraft to wind and unwind a length of cable; means for selectively actuating said reel to wind and unwind said cable; a network of interconnected frame elements defining receptor means for nesting at least the forward portion of the tow target; means for mounting said receptor means to the aircraft; guide means carried by said receptor means for mounting said cable for movement in a path substantially coincident with the longitudinal axis of said receptor means, said cable guide means being movable relative to said receptor means coaxially thereof; and resilient means for normally urging said cable guide means to a position adjacent the open end of said receptor means for centering a tow target fixed to the outer end of the cable as the cable is wound upon said reel and said target is drawn into said receptor means under the urging of the cable.

8. In an aircraft tow target installation for use with a tow target of a forwardly tapered streamlined configuration, the combination of: a reel to be mounted to said aircraft to wind and unwind a length of cable carried thereby; a network of interconnected frame elements defining an open-ended receptor means for nesting at least the forward portion of the tow target; means for mounting said receptor means to the aircraft; guide means carried by said receptor means for mounting said cable for movement in a path substantially coincident with the longitudinal axis of said receptor means, said cable guide means including means movable relative to said receptor means coaxially thereof; and resilient means for normally holding said movable means adjacent the open end of said receptor means for centering said tow target as it is drawn into said receptor means under the urging of the cable as the latter is reeled in by said reel; and means carried by said movable means forming a thrust pad engageable with the forward section of said target for ejecting said target from said receptor means under the urging of said resilient means as said cable is unwound from said reel.

9. In an aircraft tow target installation for use with a tow target of a forwardly tapered streamlined configuration, including a reel apparatus for controlling a cable to which the target is secured, the combination of: a support member to be secured to the aircraft; a rearwardly facing cradle fixed to said support member and adapted to nest at least the forward portion of the target; a pulley, including a shaft therefor, mounted within said support section, said pulley runningly engaged by said cable and directing the latter from said reel apparatus into said cradle; guide means for said cable mounted for movement relative to said cradle coaxially thereof; resilient means normally urging said cable guide means to a position adjacent the outer end of said cradle, whereby said guide means is adapted to center the course of said cable relative to said cradle thereby centering said target as it is drawn into said cradle as said cable is wound upon the reel apparatus; electroresponsive counter mechanism adapted to be mounted in the cockpit of the towing aircraft; a normally open switch element electrically connected to said counter mechanism; means carried by said pulley shaft for closing said switch at each revolution of said pulley shaft to intermittently energize said counter mechanism to actuate the same; and means operatively associated with said pulley shaft for sensing the direction of rotation of the pulley shaft and, including means associated with said counter mechanism for additively or subtractively actuating said counter mechanism.

10. A device for releasably holding an aerial tow target of a forwardly tapered streamlined configuration to an aircraft fitted with a reel apparatus carrying a tow cable to which said target is affixed and selectively operable to play out and retrieve said cable, comprising: a body member including at one end thereof an outwardly flared open-ended receptor for supportingly nesting at least the forward portion of the tow target; means for mounting said body member to the aircraft with the open end of said receptor facing rearwardly of the aircraft; and resilient ejector means mounted to said body member for movement substantially coaxially of said receptor and adapted to engage the leading section of said forward portion of said target for resiliently urging said target outwardly of said receptor means when said cable is played out from said reel apparatus.

11. A device for releasably holding an elongate rigid aerial tow target of a forwardly tapered streamlined configuration to an aircraft fitted with a reel apparatus for controlling a cable to which said target is secured, comprising: receptor means defining a cradle for receiving and supporting at least the forward portion of said tow target; and means carried by said receptor means, including a cable guide element movable relative to said cradle coaxially thereof, for holding the cable out of engagement with said cradle and for centering the course of said tow target as it is drawn into said cradle under the urging of the cable as the latter is reeled in by said reel apparatus to supportingly nest the forward portion of said tow target within said cradle.

12. A device for releasably holding an elongate rigid aerial tow target of a forwardly tapered streamlined configuration to an aircraft fitted with a reel apparatus for controlling a cable to which said target is secured, comprising: receptor means to be mounted to the wing of the aircraft and defining a cradle facing rearwardly of the aircraft for receiving at least the forward portion of said tow target; a cable guide element carried by said receptor means for movement relative to said cradle coaxially thereof; said element having a longitudinally extending passage for guidingly passing said cable as it is reeled in or played out from said reel apparatus, the cable thereby centering said tow target as it is drawn into said cradle under the urging of the cable as the latter is reeled in by said reel apparatus, said cable guide element including at least one resilient element for normally urging the same to an outer position relative to said receptor means, whereby said guide element further acts to eject said target from said cradle as the cable is played out by said reel apparatus.

13. A device for releasably holding an elongate rigid aerial tow target of a forwardly tapered streamlined configuration to an aircraft fitted with a reel apparatus carrying a tow cable to which said target is affixed and selectively operable to play out and retrieve said cable, comprising: a body member to be mounted to said aircraft and including a rearwardly facing receptor means for supportingly nesting at least the forward portion of the tow target as said cable is retrieved by the reel apparatus; ejector means carried by said body member and engageable with the nose of said tow target for resiliently urging said tow target outwardly of said receptor means when said cable is played out from said reel apparatus; and a cable guide element carried by said ejector means for guiding said cable into said receptor means in a path substantially coincident with the longitudinal axis thereof whereby said tow target is centered relative to said receptor means as the cable is wound on said reel apparatus to draw said target into said receptor means for support thereby, the ejector means resiliently retracting to guide said target into said receptor means and to absorb the shock created by the retrievement of said tow target.

14. In combination with an aircraft, a reel apparatus upon which is wound a tow cable; means for mounting said reel apparatus to said aircraft; means for operating said reel apparatus to wind the cable thereon and unwind said tow cable therefrom; a rigid aerial tow target of a forwardly tapered streamlined configuration fixed to the free end of said tow cable; target support means carried by said reel apparatus and longitudinally projecting rearwardly therefrom and defining an outwardly flared open ended receptor facing rearwardly of said aircraft for supportingly nesting at least the forward portion of said target; means carried by said target support means, including a cable guide means movable relative to said receptor coaxially thereof, for guidingly passing said cable from said reel apparatus outwardly of said receptor and for holding said cable out of engagement with said receptor, thereby acting to center the course of said target as it is drawn into said receptor under the urging of the cable as the latter is reeled in by said reel apparatus to supportingly nest the forward portion of said tow target within said receptor.

15. In an aircraft tow target installation, the combination of: a rigid aerial tow target of a forwardly tapered stream-lined configuration; a reel apparatus to be fixed to an aircraft, said reel apparatus carrying a tow cable to which said target is affixed and selectively operable to play out and retrieve said cable; a body member to be mounted to said aircraft and including a support member having a rearwardly facing receptor means for supportingly nesting at least the forward portion of the tow target as said cable is retrieved by the reel apparatus and said target is drawn into said receptor means; a cable guide element carried by said support member and movable relative thereto for receiving and guiding said cable into said receptor means in a path substantially coincident with the longitudinal axis thereof, whereby said tow target is centered relative to said receptor means as said target moves into said receptor means under the urging of the cable as the latter is wound on said reel apparatus; and ejector means, including a thrust pad engaged with the nose of said target as the latter is supportingly nested within said receptor means for resiliently urging said tow target outwardly of said receptor means when said cable is played out from said reel apparatus.

References Cited in the file of this patent
FOREIGN PATENTS
667,202    Great Britain _____ Feb. 27, 1952